E. WRIGHT.
TIRE CORE.
APPLICATION FILED SEPT. 13, 1921.

1,415,755.

Patented May 9, 1922.

Edward Wright
INVENTOR

BY Victor J. Evans
ATTORNEY

WITNESS:

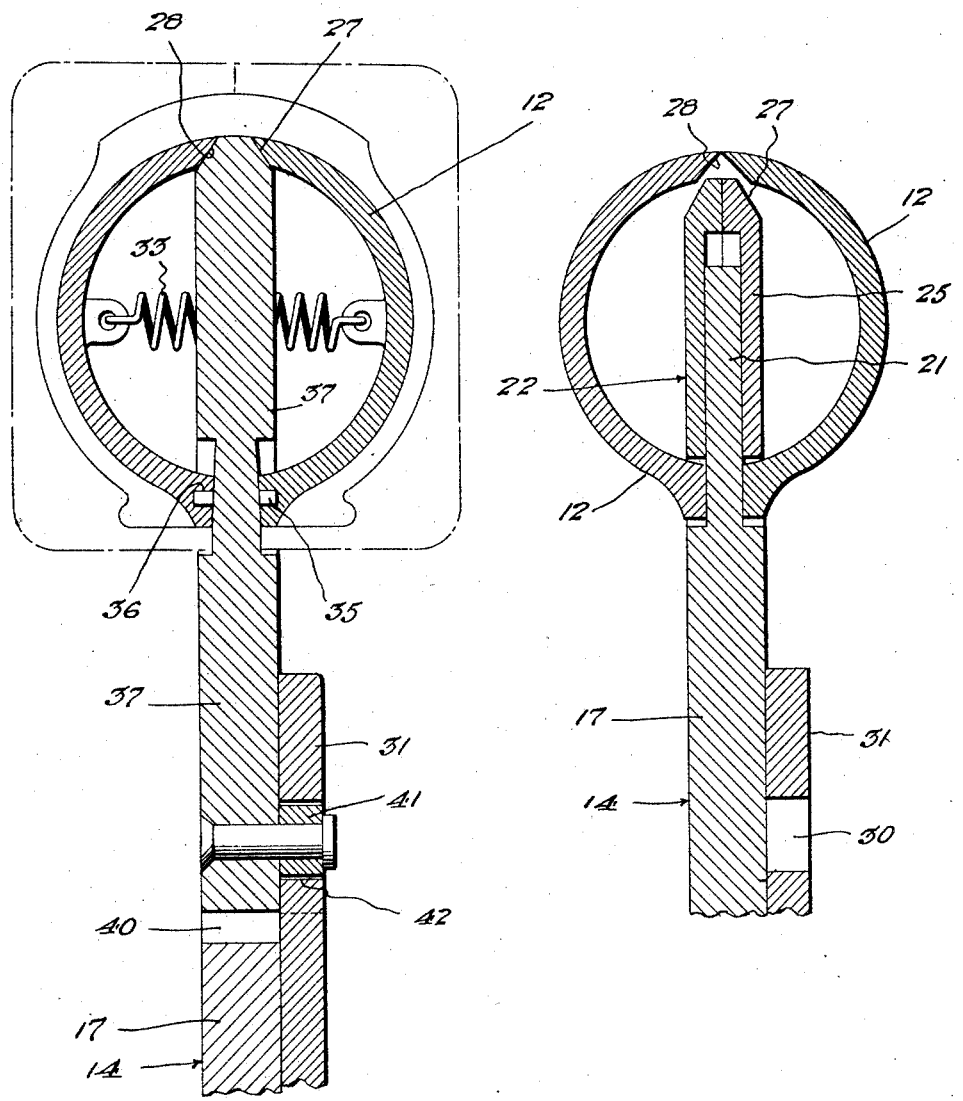

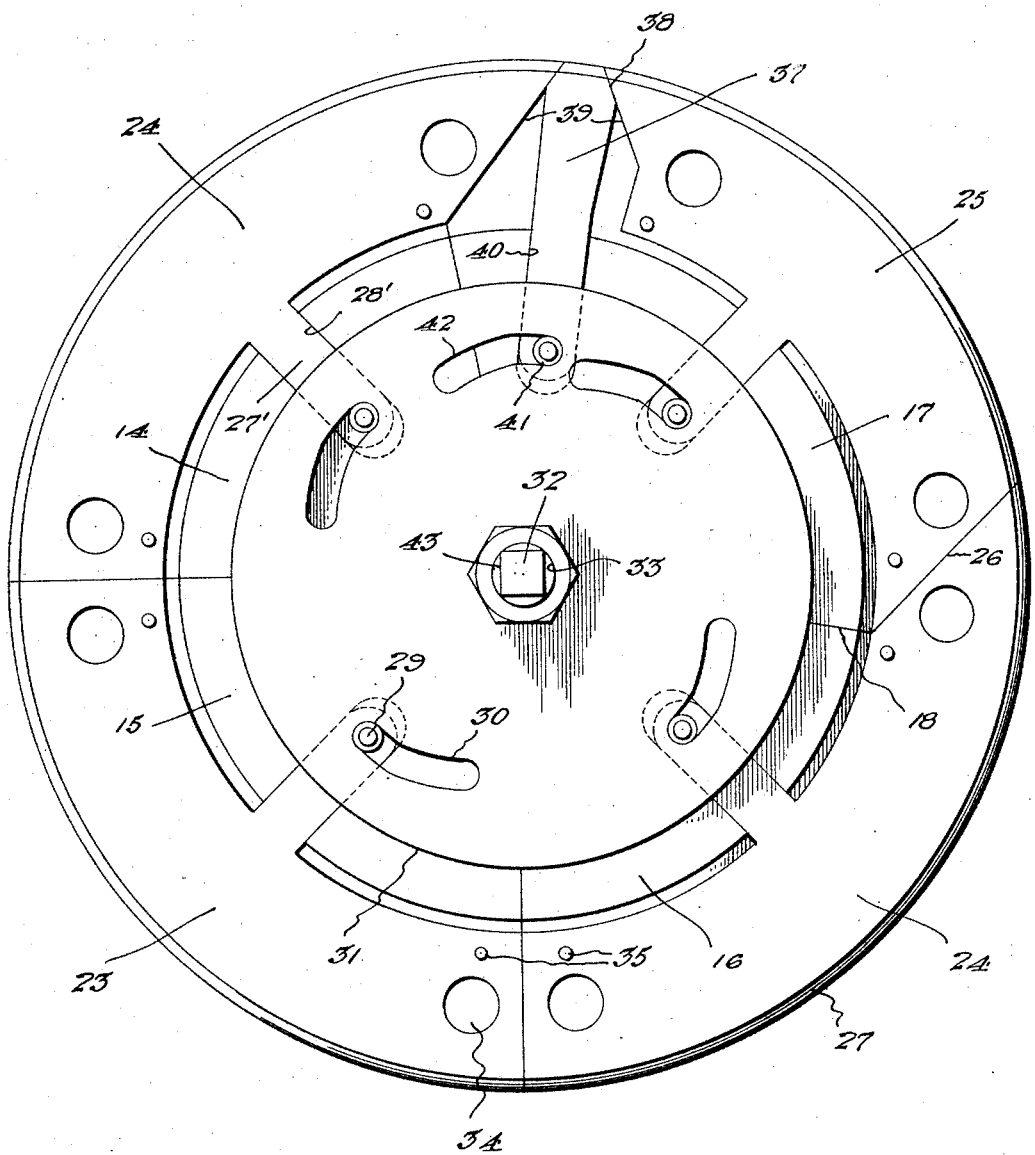

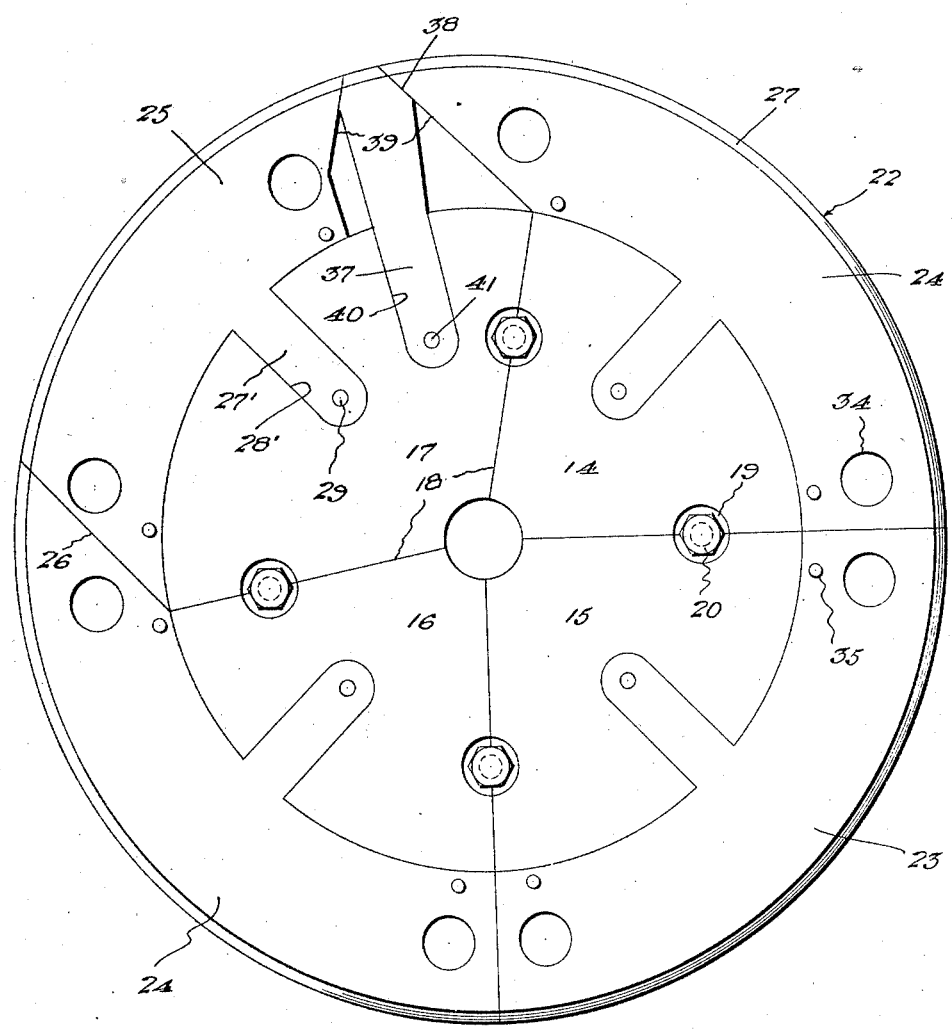

UNITED STATES PATENT OFFICE.

EDWARD WRIGHT, OF DAYTON, OHIO.

TIRE CORE.

1,415,755.

Specification of Letters Patent.　　Patented May 9, 1922.

Application filed September 13, 1921. Serial No. 500,278.

*To all whom it may concern:*

Be it known that I, EDWARD WRIGHT, a citizen of the United States, residing at Dayton, in the county of Montgomery and State of Ohio, have invented new and useful Improvements in Tire Cores, of which the following is a specification.

This invention relates to the art of making pneumatic tires and has especial relation to the manufacture of pneumatic tire casings.

An object of the invention is the provision of an expansible core for use in expanding a tire casing after the latter has been built, the core being of a character whereby the said casing may be constructed thereon and the expanding action provided without removing the tire from the core.

Another object of the invention is the provision of a core of this character which may be expanded uniformly throughout, the means provided whereby this is accomplished, being of a simple character, so as to provide ease of operation, freedom from repairs and consequent economy of production.

With the above and other objects in view, the invention further includes the following novel features and details of construction, to be hereinafter more fully described, illustrated in the accompanying drawings and pointed out in the appended claims.

In the drawings:—

Figure 2 is an enlarged sectional view on the line 2—2 of Figure 1 showing the core within a tire and a mold in position.

Figure 3 is a section on the line 3—3 of Figure 1 showing the mold collapsed.

Figure 4 is a face view of the invention with the sectional core members removed and looking at the cam plate with the wedge in its extended or expanding position.

Figure 5 is a similar view looking at the opposite side of the body plate with the wedge retracted.

Figure 1:
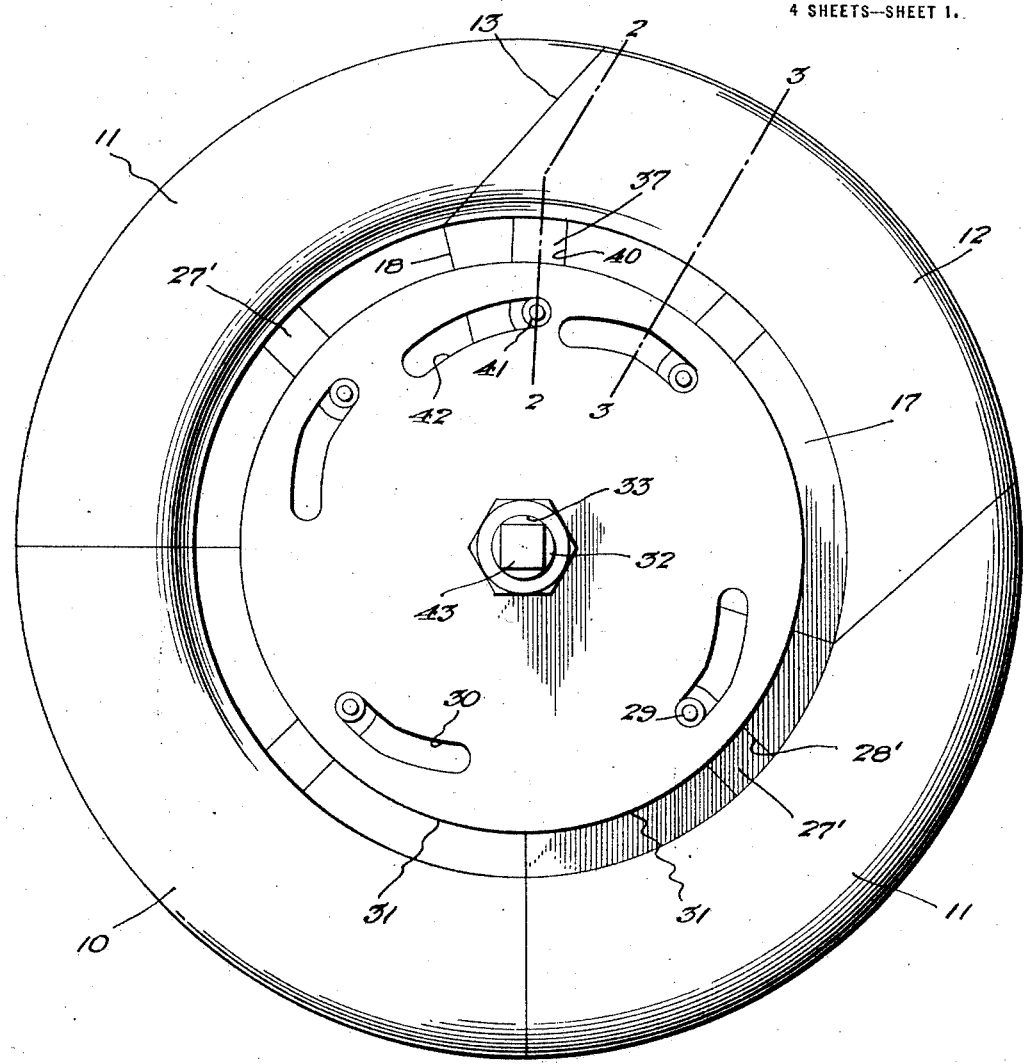
Figure 1 is a plan view of an expansible core constructed in accordance with the invention and shown in expanded position.

Referring in detail to the drawings, wherein like characters of reference denote corresponding parts, the core which comprises the subject matter of the present invention comprises a plurality of sectional core members which are indicated at 10, 11 and 12. Each of these core members are substantially semi-circular in cross section as illustrated in Figures 2 and 3 and when in position provide a substantially circular member having a hollow cylindrical cross section. The abutting ends of the members 10 and 11 are on a line with the radius of the center of the core, while the abutting ends of the members 11 and 12 are on a line tangent to the said center as shown at 13.

The core sections 10, 11 and 12 are designed to be transversely expanded and for this purpose there is provided a body plate 14 which includes sections 15, 16 and 17. The section 15 forms a fourth of a circle and the sections 16 abut the opposite edges of this section, while the opposite edges of the sections 16 are of an irregular shape so as to provide tangent edges 18 which coincide so as to provide counterbored openings 19 when the body plate sections are assembled, which openings receive bolts 20 for use in holding the sections assembled. The outer edge of the body plate sections is substantially reduced so as to provide a tongue 21 and slidingly mounted upon this tongue is an expansible wedge 22. This wedge is also formed in sections and includes sections 23, 24 and 25, the abutting ends of these sections conforming to the abutting ends of the core sections 10, 11 and 12 so that the abutting ends of the wedge sections 24 and 25 are tangentially disposed as shown at 26. Each of the wedge sections has its outer edge beveled as shown at 27 for engagement with the beveled edges 28 of the core sections 10, 11 and 12, the purpose being to move the wedge sections radially so that the core sections will ride upon these beveled edges and be transversely expanded.

Each of the wedge sections 23, 24 and 25 are provided with inwardly extending arms 27', which operate in slots 28' provided in the sections 15, 16 and 17, of the body plate 14. The arms 27' carry at their inner ends pins or rollers 29 which are adapted to enter cam grooves 30 provided in a cam plate 31. This cam plate is mounted upon the sectional body plate by means of a shaft 32 which operates in an opening 33 provided in the body plate and when the said cam plate is rotated, the slots 30 will through the medium of the rollers or pins 29, move the wedge sections outwardly so as to expand the core sections, as previously stated. The core sections are normally retracted and are expanded against the actions of springs 33 which connect the opposite core sections near each end thereof and which pass through openings 34 provided near each end of the body plate sections. Pins 35 extend from each face of each of the wedge sections, adjacent each end of each section and are adapted to enter sockets 36 provided in the core sections, 10, 11 and 12 so as to hold the latter in position.

To further aid in expanding the wedge so as to provide for a uniform expansion of the core sections, there is provided a supplemental wedge section 37. This section 37 has its outer end beveled as shown at 38 so as to operate against the opposed beveled ends 39 of the core sections 24 and 25, the beveled end of the core section 24 being formed by the tangent line previously mentioned. The inner end of the wedge section 37 operates within a slot 40 provided in the body plate section 17 and carries a roller 41 which operates in a slot 42 provided in the cam plate 31. The shape of this slot 42 is different from the slots 30 so as to provide for a portion of the wedge section 37 in advance of the operation of the remaining sections.

In the use of the invention, the core is retracted and the tire casing built thereon in the usual or any preferred manner. After the casing has been completed it is placed in position within the mold and the core expanded by turning the hand plate in a clockwise direction, this turning being accomplished through the medium of handles or wrenches applied to the squared ends 43 of the shaft 32. The tire may then be cured without removing the core. After the curing has been effected, the cam plate is rotated in an opposite direction, whereupon the tire is removed from the mold and the cam plate lifted off or removed from the body plate. The bolts 20 are then removed so as to separate the sections of the body plate, the section 17 being first removed, whereupon the remaining sections may be easily taken out of the core. The core sections will thus be collapsed to an extent to permit of their ready removal from the tire casing.

The invention is susceptible of various changes in its form, proportions and minor details of construction and the right is herein reserved to make such changes as properly fall within the scope of the appended claims.

Having described the invention what is claimed is:—

1. A core for tire molds comprising opposed substantially circular core members, yieldable means for normally urging the members toward one another, radially movable means positioned between the core members, whereby the latter may be expanded and means including a rotatable cam plate engageable with the radially movable means, whereby the latter may be operated.

2. A core for tire molds comprising opposed substantially circular core members, yieldable means for normally urging the members toward one another, radially movable means including circumferentially arranged projecting members, whereby the core members may be expanded and means including a rotatable plate having cam slots therein for receiving the projecting members, whereby the radially movable means may be operated.

3. A core for tire molds comprising a sectional circular body plate, a sectional wedge positioned circumferentially of and movable radially upon the body plate, sectional core members carried by said wedge and means mounted upon the body plate and engageable with the wedge, whereby the latter may be operated to expand the core members.

4. A core for tire molds comprising a sectional body plate, a sectional wedge positioned circumferentially of and movable radially upon the body plate, sectional core members carried by said wedge, inwardly extending radially disposed arms carried by each of the wedge sections and rotatable means engageable with the arms, whereby the wedge sections may be moved radially to expand the core members.

In testimony whereof I affix my signature.

EDWARD WRIGHT.